(12) United States Patent
Huang et al.

(10) Patent No.: US 10,042,914 B2
(45) Date of Patent: Aug. 7, 2018

(54) DATABASE INDEX FOR CONSTRUCTING LARGE SCALE DATA LEVEL OF DETAILS

(71) Applicant: International Business Machines Corporation, Armonk, NY (US)

(72) Inventors: Wei Huang, Beijing (CN); Jing Jing Liu, Beijing (CN); DaJiang Tao, Beijing (CN); Chen Wang, Beijing (CN); Sheng Zhao, Beijing (CN); Zan Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 14/735,246

(22) Filed: Jun. 10, 2015

(65) Prior Publication Data

US 2016/0364421 A1    Dec. 15, 2016

(51) Int. Cl.
    *G06F 17/30*    (2006.01)
(52) U.S. Cl.
    CPC .. *G06F 17/30598* (2013.01); *G06F 17/30321* (2013.01); *G06F 17/30327* (2013.01)
(58) Field of Classification Search
    CPC ......... G06F 17/30598; G06F 17/30331; G06F 17/30327; G06F 17/30339; G06F 17/30592
    See application file for complete search history.

(56) References Cited

U.S. PATENT DOCUMENTS

| 6,581,058 B1* | 6/2003 | Fayyad ............... G06F 17/3061 707/737 |
| 7,272,612 B2 | 9/2007 | Birdwell et al. |
| 8,639,692 B2 | 1/2014 | Chen et al. |
| 9,043,359 B2 | 5/2015 | Bayliss |

(Continued)

FOREIGN PATENT DOCUMENTS

| CN | 103544258 A | 1/2014 |
| EP | 1852787 A1 | 11/2007 |

(Continued)

OTHER PUBLICATIONS

Huang et al., "Database Index for Constructing Large Scale Data Level of Details", U.S. Appl. No. 14/987,056, filed Jan. 4, 2016.

(Continued)

*Primary Examiner* — Jean M Corrielus
(74) *Attorney, Agent, or Firm* — Andrew Aubert; David B. Woycechowsky

(57) ABSTRACT

An index for large databases is disclosed. Data is grouped into clusters and the clusters are grouped into levels of detail. Analysis results are determined based on progressive data sampling. Sampling is conducted based on the level of detail required and/or the resources (time or computing resources) that are available. Larger, more concentrated clusters, at higher levels of detail, are sampled more sparsely. Smaller, more diffuse clusters, at lower levels of detail, are sampled more intensively. Analysis results, including outlier data, include proportional representation (Continued)

from the whole database up to the level of detail required. Results are quickly determined with specified degree of accuracy, based on initial sampling, and are refined with subsequent sampling.

6 Claims, 16 Drawing Sheets

(56) References Cited

U.S. PATENT DOCUMENTS

| | | | |
|---|---|---|---|
| 9,384,256 B2* | 7/2016 | Banerjee | G06F 17/30592 |
| 2005/0156766 A1* | 7/2005 | Melanson | H03M 7/3011 |
| | | | 341/143 |
| 2007/0174309 A1* | 7/2007 | Pettovello | G06F 17/30327 |
| 2008/0172402 A1* | 7/2008 | Birdwell | G06F 17/30327 |
| 2009/0018996 A1* | 1/2009 | Hunt | G06Q 30/02 |
| 2009/0225986 A1* | 9/2009 | Gennaro | H04L 9/0836 |
| | | | 380/278 |
| 2011/0010358 A1* | 1/2011 | Zane | G06F 17/30421 |
| | | | 707/714 |
| 2013/0254212 A1 | 9/2013 | Rao et al. | |
| 2014/0101178 A1 | 4/2014 | Ginter | |
| 2014/0115009 A1* | 4/2014 | Lashley | G06F 17/30 |
| | | | 707/797 |
| 2014/0207754 A1* | 7/2014 | Lashley | G06F 17/30 |
| | | | 707/715 |
| 2014/0304266 A1* | 10/2014 | Leuoth | G06F 17/30327 |
| | | | 707/737 |
| 2015/0205856 A1* | 7/2015 | Brill | G06Q 30/0201 |
| | | | 707/737 |
| 2015/0295807 A1* | 10/2015 | Huang | H04L 43/062 |
| | | | 709/224 |
| 2015/0310051 A1* | 10/2015 | An | G06F 17/30339 |
| | | | 707/738 |
| 2016/0055220 A1* | 2/2016 | Joshi | G06F 17/30336 |
| | | | 707/722 |
| 2016/0283140 A1* | 9/2016 | Kaushik | G06F 3/0643 |
| 2016/0364421 A1* | 12/2016 | Huang | G06F 17/30598 |
| 2016/0364425 A1* | 12/2016 | Dole | G06F 17/30536 |
| 2016/0364468 A1* | 12/2016 | Huang | G06F 17/30598 |
| 2017/0116315 A1* | 4/2017 | Xiong | G06F 17/30598 |

FOREIGN PATENT DOCUMENTS

| | | |
|---|---|---|
| EP | 2778965 A1 | 9/2014 |
| WO | 2014096796 A1 | 6/2014 |

OTHER PUBLICATIONS

Appendix P—List of IBM Patents or Patent Applications Treated as Related, 2 pages.
U.S. Appl. No. 14/987,056, filed Jan. 4, 2016.

* cited by examiner

DATABASE INDEX FOR CONSTRUCTING LARGE SCALE DATA LEVEL OF DETAILS

BACKGROUND OF THE INVENTION

The present invention relates generally to the field of database indexes and more particularly to database indexes for extremely large databases.

The Wikipedia entry for "B+ Tree" (internet address: http://en.wikipedia.org/wiki/B %2B_tree) states as follows (as of 27 Mar. 2015): "A B+ tree is an n-ary tree with a variable but often large number of children per node. A B+ tree consists of a root, internal nodes and leaves. The root may be either a leaf or a node with two or more children. A B+ tree can be viewed as a B-tree in which each node contains only keys (not key-value pairs), and to which an additional level is added at the bottom with linked leaves. The primary value of a B+ tree is in storing data for efficient retrieval in a block-oriented storage context—in particular, filesystems . . . . Relational database management systems . . . support this type of tree for table indices." (footnotes omitted)

The Wikipedia entry for "cluster analysis" (internet address: http://en.wikipedia.org/wiki/Cluster_analysis) states as follows (as of 28 Mar. 2015): "Cluster analysis or clustering is the task of grouping a set of objects in such a way that objects in the same group (called a cluster) are more similar (in some sense or another) to each other than to those in other groups (clusters) . . . . Cluster analysis itself is not one specific algorithm, but the general task to be solved. It can be achieved by various algorithms that differ significantly in their notion of what constitutes a cluster and how to efficiently find them. Popular notions of clusters include groups with small distances among the cluster members, dense areas of the data space, intervals or particular statistical distributions. Clustering can therefore be formulated as a multi-objective optimization problem. The appropriate clustering algorithm and parameter settings (including values such as the distance function to use, a density threshold or the number of expected clusters) depend on the individual data set and intended use of the results. Cluster analysis as such is not an automatic task, but an iterative process of knowledge discovery or interactive multi-objective optimization that involves trial and failure. It will often be necessary to modify data preprocessing and model parameters until the result achieves the desired properties."

SUMMARY

According to an aspect of the present invention, there is a method, computer program product and/or system that performs the following steps (not necessarily in the following order): (i) receiving a plurality of record identifiers with each record identifier uniquely identifying a record in a database; (ii) performing cluster analysis on the records corresponding to the plurality of record identifiers to yield a plurality of clusters, with each cluster including at least one record; and (iii) constructing a database index data structure where: each record identifier is represented a leaf node, each cluster is represented as a non-leaf node, and each leaf node is related to at least one non-leaf node base upon which record identifiers belong to which clusters.

DETAILED DESCRIPTION

Figure 1:
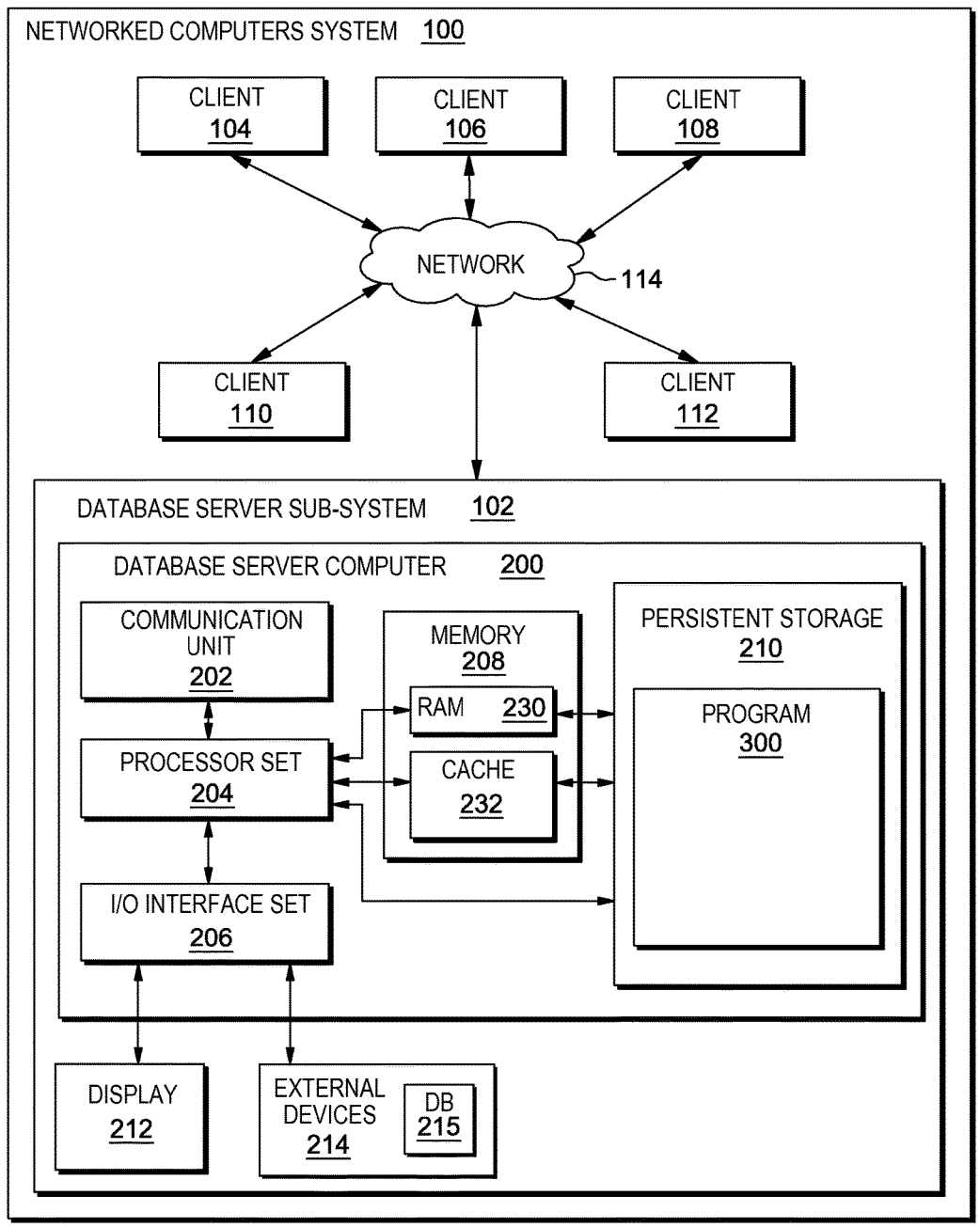
FIG. 1 is a block diagram view of a first embodiment of a system according to the present invention.

Some embodiments of the present invention introduce a new type of database index that is based on cluster analysis. More specifically: (i) the records of the database correspond to leaf nodes; and (ii) the leaf nodes are related to non-leaf nodes (also sometimes herein referred to as "intermediate nodes"), where each non-leaf node corresponds to a cluster derived from cluster analysis preformed on the records of the database. The non-leaf nodes of the database index may include various metadata about the corresponding cluster, such as range, cardinality (that is, number of records in the cluster), LOD (level of details) and/or cluster density. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: database server sub-system 102; client sub-systems 104, 106, 108, 110, 112; communication network 114; database server computer 200; communication unit 202; processor set 204; input/output (I/O) interface set 206; memory device 208; persistent storage device 210; display device 212; external device set 214; random access memory (RAM) devices 230; cache memory device 232; database 215; and program 300.

Sub-system 102 is, in many respects, representative of the various computer sub-system(s) in the present invention.

Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
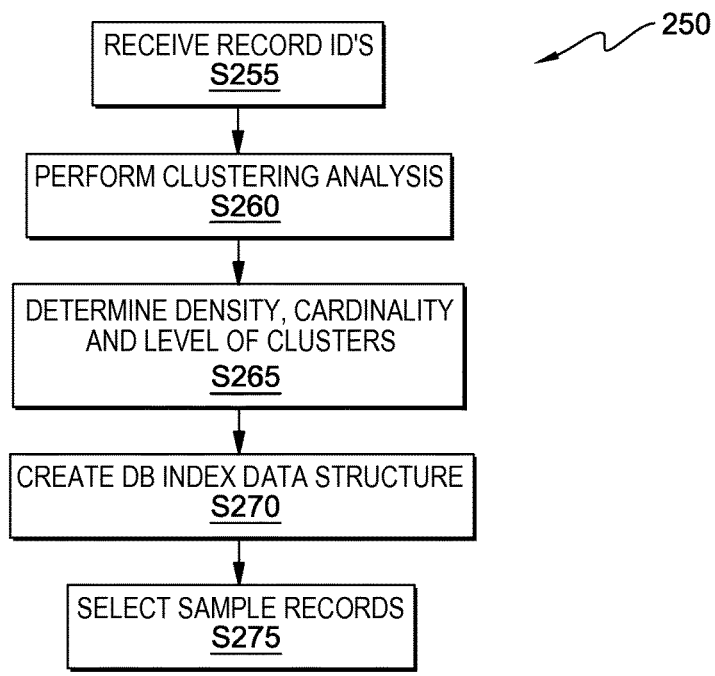
FIG. 2 is a flowchart showing a first embodiment method performed, at least in part, by the first embodiment system.
Figure 3:
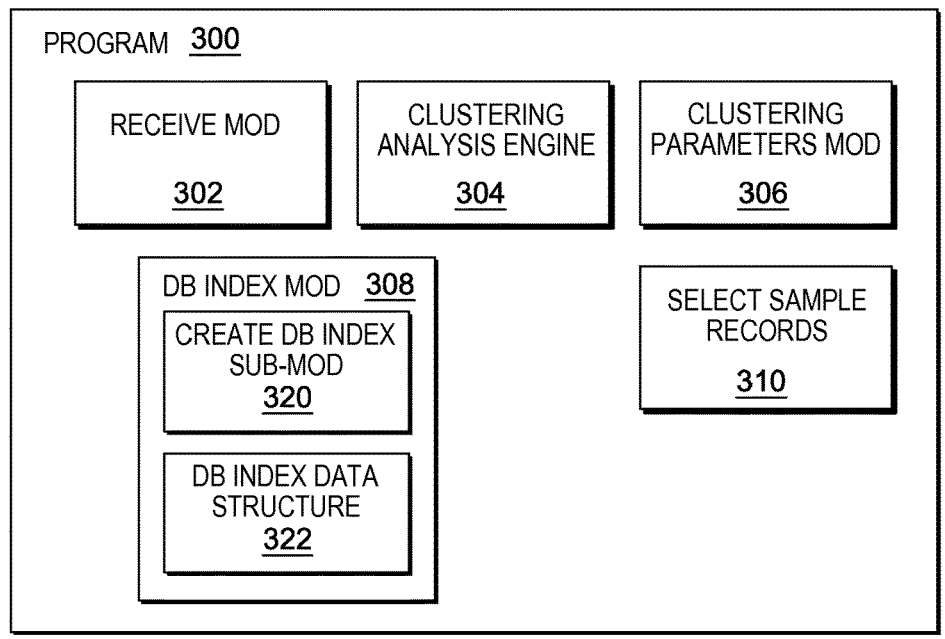
FIG. 3 is a block diagram showing a machine logic (for example, software) portion of the first embodiment system.

FIG. 2 shows flowchart 250 depicting a method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where receive module ("mod") 302 receives record identifiers respectively, and uniquely, associated with records in database 215 (see FIG. 1). These record identifiers are used to selectively access individual records in the data base so that: (i) cluster analysis can be performed (as will be further described, below); and (ii) a database index data structure can be constructed (as will also be discussed further, below). Some specific forms that these record identifiers may take will be discussed, below, in the Further Comments And/Or Embodiments sub-section of this Detailed Description section.

Processing proceeds to step S260, where clustering analysis engine 304 performs clustering analysis on the records of database 215 (see FIG. 1) with respect to one or more cluster-basis variables. The clustering analysis use any specific type of clustering analysis algorithm(s) (now known or to be developed in the future). The clustering analysis yields multiple clusters, with each cluster including at least one (and usually more) records.

In some embodiments, a given record may belong to only one cluster, which will lead to a database index data structure having a hierarchical form. In some embodiments, a cluster may include sub-clusters, sub-sub-clusters, and so on, where at least some of the clusters are further broken into smaller clusters within the larger clusters. As will be appreciated by those of skill in the art, this sub-clustering feature, when present, can be accommodated by the database index data structure that will be discussed, below.

Processing proceeds to step S265, where clustering parameters mod 306 determines various types of metadata associated with each cluster of the multiple clusters previously determined at step S260. In this embodiment, the calculated cluster metadata includes the following clustering parameters: (i) range; (ii) cardinality; (iii) Level Of Detail (LOD); and (iv) cluster density. These clustering parameters will be discussed, below, in the Further Comments And/Or Embodiments sub-section of this Detailed Description section.

Processing proceeds to step S270, where create database index sub-module 320, of database index mod 308, creates and stores database index data structure 322 in database index mod 308. In database index data structure 322: (i) each record identifier is represented as a leaf node; (ii) each cluster is represented as a non-leaf node (also sometimes referred to herein as an intermediate node); (iii) each leaf node is related to at least one non-leaf node based upon the clusters to which the record of the record identifier of the leaf node belongs; and (iv) each leaf node includes clustering parameter metadata including range, cluster density, LOD and cardinality.

Processing proceeds to step S275, where select sample records mod 310 uses database index structure 322 to select a sub-set of records from database 215 (see FIG. 1) for sampling purpose. As will be further discussed in the following sub-section of this Detailed Description section, database index data structure can help facilitate effective and efficient sampling in various ways and for various reasons.

III. FURTHER COMMENTS AND/OR EMBODIMENTS

Some embodiments of the present invention may include one, or more, of the following characteristics, features and/or advantages: (i) effective querying on a huge database that would be very complex if performed by conventional techniques; (ii) effective querying where it is impractical to access all of the data, relevant to a query, within a reasonable span of time; (iii) effective querying where it is not necessary to access all of the data relevant to a query; and/or (iv) effective querying where in cases where a user is interested in finding overall trends or patterns, where approximate answers, within some margin of error, will suffice, trading off data mining and analysis speed against accuracy.

Some embodiments of the present invention may include one, or more, of the following features, characteristics and/or advantages: (i) simplifies querying of a huge dataset; (ii) reduces the query/access response time; (iii) makes it unnecessary to access the entire dataset relevant to a query; (iv) finds overall trends or patterns quickly; (v) does not require an entire dataset to be sampled and processed for analytics; (vi) focuses sampling techniques on accurately representing the whole dataset (including outliers); (vii) reasonably characterizes the whole dataset with sampled values; (viii) initially samples from only the typical and most important data points to quickly estimate the analytic results based, at least in part, on the sampled subset; (ix) derives overall trends or patterns that are approximated within an acceptable margin of error; (x) refines the analysis by progressively scanning and operating on more data; (xi) represents the data variety and shape of the original full set; (xii) bases the data visualization and analysis result to meet the customer's acceptable margin of error; (xiii) achieves quick response time for big data analytics; (xiv) trades off analysis speed with analysis accuracy; (xv) accurately represents outliers, even if the outliers represent a small fraction of the data; and/or (xvi) represents the variety and shape of original full dataset such that the data visualization and analysis result, based on this subset, meets the customer's required degree of accuracy.

Further, with respect to item (v) in the above paragraph, some embodiments of the present invention provide improved sampling results than are obtained using traditional sampling techniques such as random sampling, systematic sampling, rational subgrouping, and/or stratified random sampling.

In some embodiments of the present invention, database row-level Bernoulli sampling selects a sample of P percent of the table rows by means of a "SARGable" (search argument able) predicate that includes each row in the sample with a probability of (P/100) and excludes each row in the sample with a probability of (1−P/100). Row-level Bernoulli sampling produces a valid, random sample regardless of data clustering, but may miss important information contained within outlier data.

Database system page-level sampling is similar to row-level sampling, except that pages, not rows, are sampled. A page is included in the sample with a probability of P/100. If a page is included, all of the rows in that page are included in the sample. Performance of system page-level sampling is excellent, but the accuracy of aggregate estimates tends to be worse under page-level sampling than row-level sampling. This disparity in accuracy is most pronounced when there are many rows per block or when the columns referenced in the query exhibit a high degree of clustering within the pages.

Figure 4:
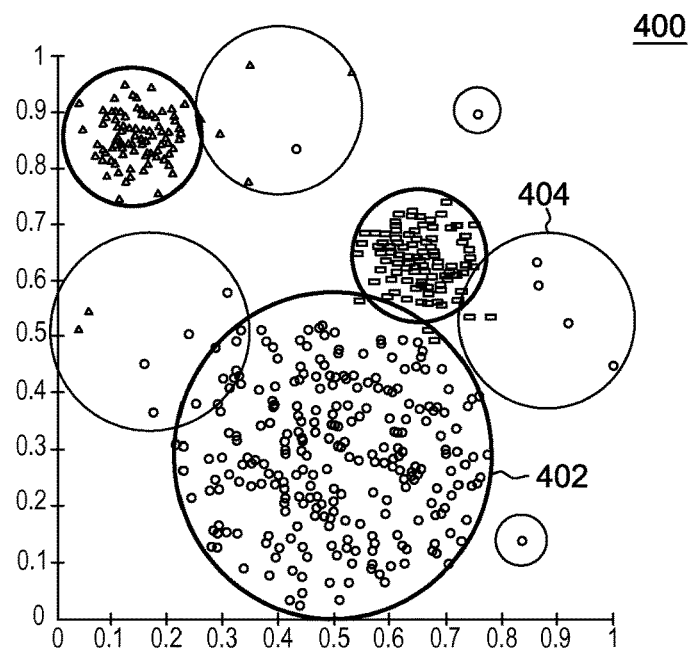
FIG. 4 is a graph that is helpful in understanding embodiments of the present invention.

As shown in FIG. 4, graph 400 shows LOD (level of details) index data clustering. Clusters, for example clusters 402 and 404, represent data clusters identified by some embodiments of the present invention. Cluster 402 includes the main body of the dataset. Cluster 404 is a more sparsely populated cluster including some outliers in the dataset. LOD index data clustering: (i) clusters data according to the data distribution; (ii) prioritizes clusters; (iii) optimizes the processing of each cluster; and/or (iv) effectively implements the approach in a database management system.

Figure 5:
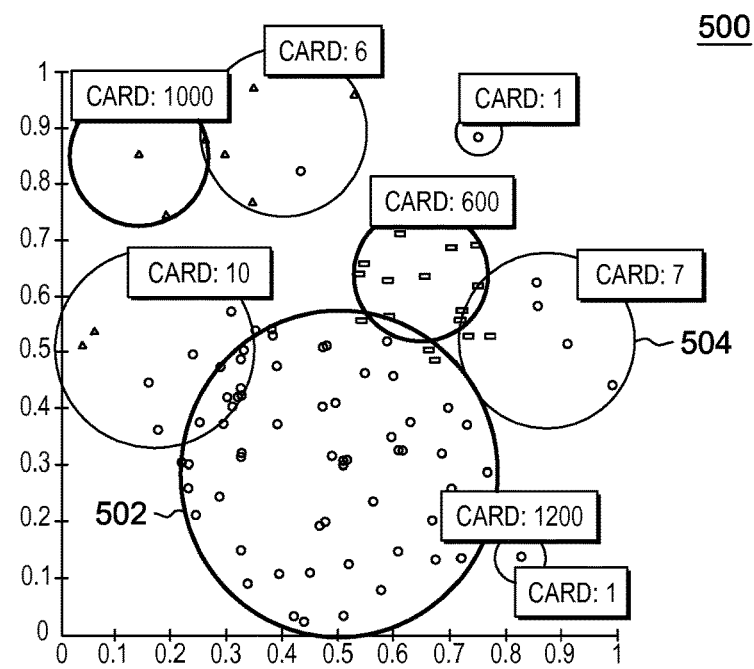
FIG. 5 is a graph that is helpful in understanding embodiments of the present invention.

As shown in FIG. 5, graph 500 shows samples as selected from clusters according to some embodiments of the present invention. For example, sample 502 represents a sample from cluster 402. Cluster 402 has a cardinality of 1200 (note: FIG. 5 not to scale with respect to cardinality), and is represented with a relatively sparse sample 502 selected from cluster 402. In contrast, sample 504 represents a sample selected from cluster 404. Cluster 404 has a cardinality of 7. Cluster 404 is typically represented with a relatively more intensive sample 504. Due to the small size of cluster 404 (a lower level cluster), the sampling rate can include up to a 100 percent sampling from cluster 404, without a significant adverse effect on query or analysis processing times.

Some embodiments of the present invention may include one, or more, of the following features, characteristics and/or advantages: (i) introduces a new type of database index—LOD index ("level of details" index); (ii) introduces an LOD index building method; and/or (iii) introduces a progressive scan based on LOD index. Further with reference to item (i) above, a database can use LOD index to split a dataset into different levels of detail based on data clustering.

Figure 6:
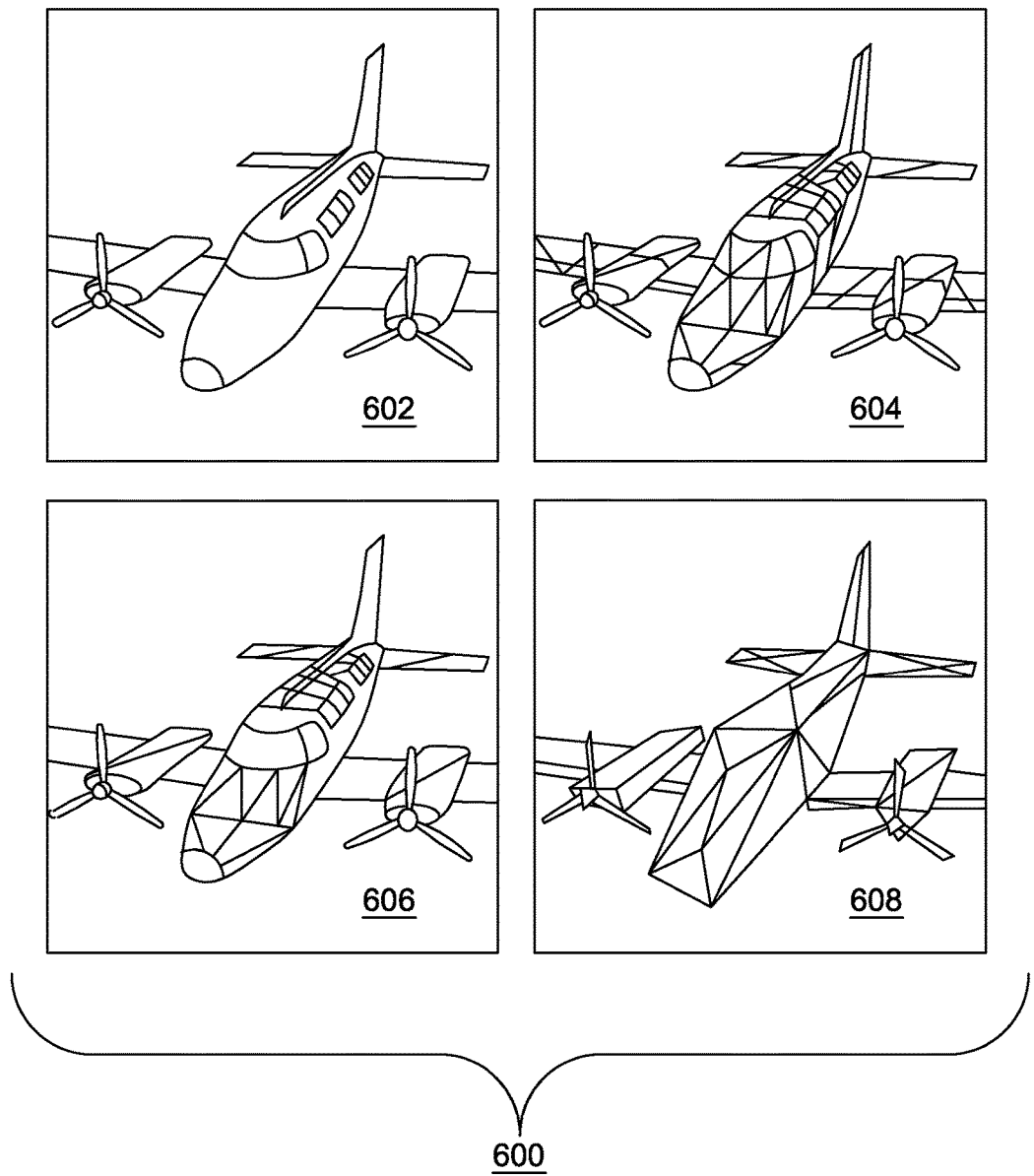
FIG. 6 is a series of screenshots that are helpful in understanding embodiments of the present invention.

FIG. 6 is a series of screenshot views 600 showing information that is helpful in understanding embodiments of the present invention. FIG. 6 illustrates an example usage, in the field of computer graphics, of some embodiments of the present invention. As shown in FIG. 6, screenshots 602, 604, 606 and 608 show computer renderings of a finite-element model representation of an aircraft. Rendering 602 is derived from the full dataset including all data points at all levels of detail. Rendering 604 is derived from full datasets from level-1 through level-3 and sparse sampling from level-4 data. Rendering 606 is derived from full dataset from level-1 and level-2 data, and sparse sampling from level-3 and level-4 data. Rendering 608 is derived from the full dataset of level-1 data and very sparse sampling from level-2 through level-4 data.

The aspects of the LOD index will now be discussed in the following paragraphs according to some embodiments of the present invention.

The LOD index: (i) organizes a dataset into clusters according to density; and/or (ii) groups the clusters into respective levels. "Level" is a joint factor of multiple dimensions, including, but not limited to: (i) data density; (ii) cardinality of a cluster; and/or (iii) range of values in a cluster. In a cluster: (i) the higher the level, the denser the data; and/or (ii) the greater the amount of data, the smaller the range.

In a query or data analysis operation, the database: (i) processes the data level by level; (ii) processes a small number of levels to quickly return a reasonably accurate intermediate estimated result; and/or (iii) progressively processes remaining levels to refine the intermediate result. The LOD index makes use of both the main body of data in a dataset and the outlier data to accurately represent the full dataset in the samples.

Figure 7:
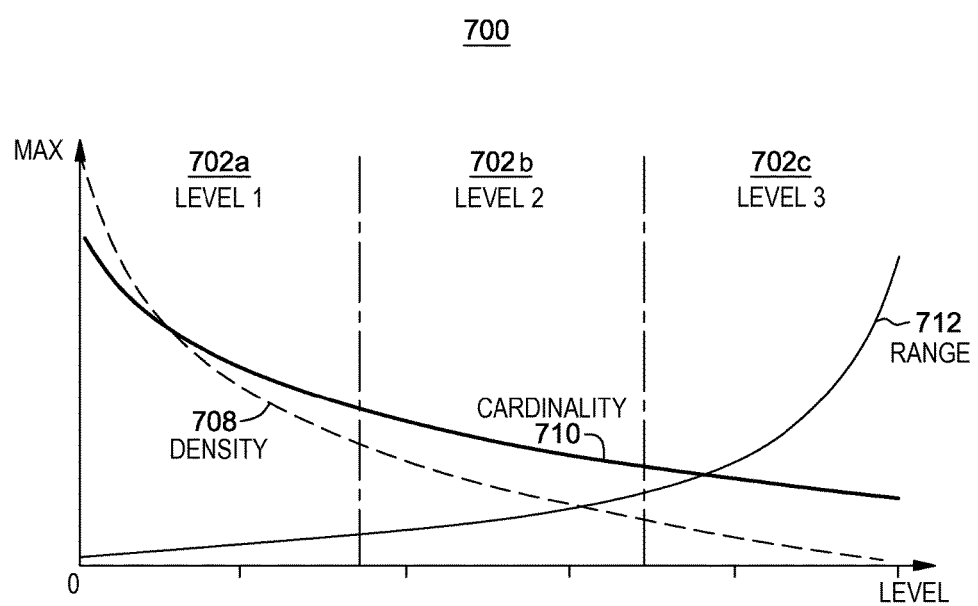
FIG. 7 is a graph that is helpful in understanding embodiments of the present invention.

As shown in FIG. 7, graph 700 shows typical qualitative relationships between a data cluster level and its density, cardinality, and range. While a dataset can have any number of levels, graph 700 shows three levels for illustrative purposes. Graph 700 includes: (i) level-1 702a (the topmost level); (ii) level-2 702b; (iii) level-3 702c (the lowest level); (iv) density plot 708; (v) cardinality plot 710; and (vi) range plot 712. Further with reference to item (ii) above, in some embodiments of the present invention, level-2 702b represents any number of intermediate levels between level-1 702a and level-3 702c.

Density plot 708 represents data cluster density as a function of the LOD index level. Cardinality plot 710 represents data cluster cardinality as a function of the LOD index level. Range plot 712 represents data cluster range as a function of the LOD index level.

A higher level data cluster, such as level-1 702a, generally has a greater density, a greater cardinality and a smaller range (refer to density plot 708, cardinality plot 710, and range plot 712 respectively) when compared with lower levels.

A lower level data cluster, such as level-3 702c, generally has a smaller density, a smaller cardinality and a greater range (refer to density plot 708, cardinality plot 710, and range plot 712 respectively) when compared with higher levels.

In some embodiments of the present invention, data in higher level clusters generally have greater similarity than data in lower level clusters. The data distribution in a higher level cluster can be represented well by relatively sparse sampling from the cluster. In some embodiments, a whole higher level cluster can be approximately represented by, at least, the cluster's "density center" (also known as the arithmetic "mean") and its cardinality. In some embodiments, density center is one or more statistical characteristic (s) other than arithmetic mean.

According to some embodiments of the present invention, in contrast to data in higher level clusters, data in lower level clusters have greater diversity and may typically represent outliers in datasets. Each data point in a lower level cluster is significant in describing the shape of the data distribution. The data distribution of lower level clusters can only be covered well by relatively intensive sampling. Because the cardinality of a lower level cluster is small, intensive sampling from a lower level cluster typically has a reasonable cost.

In some embodiments of the present invention, each level of an LOD index represents different levels of detail with respect to a dataset. Higher level clusters represent lower detail of the dataset, because the data therein represents a large proportion, and is a main body of the dataset. Sparse sampling can be used to process data in a higher level cluster because the data therein has relatively less dispersion than data in a lower level cluster. Lower level clusters represent finer detail, because they represent outlier values in the dataset, which are a minor part of the dataset, but also provide important details of the datasets.

Figure 8:
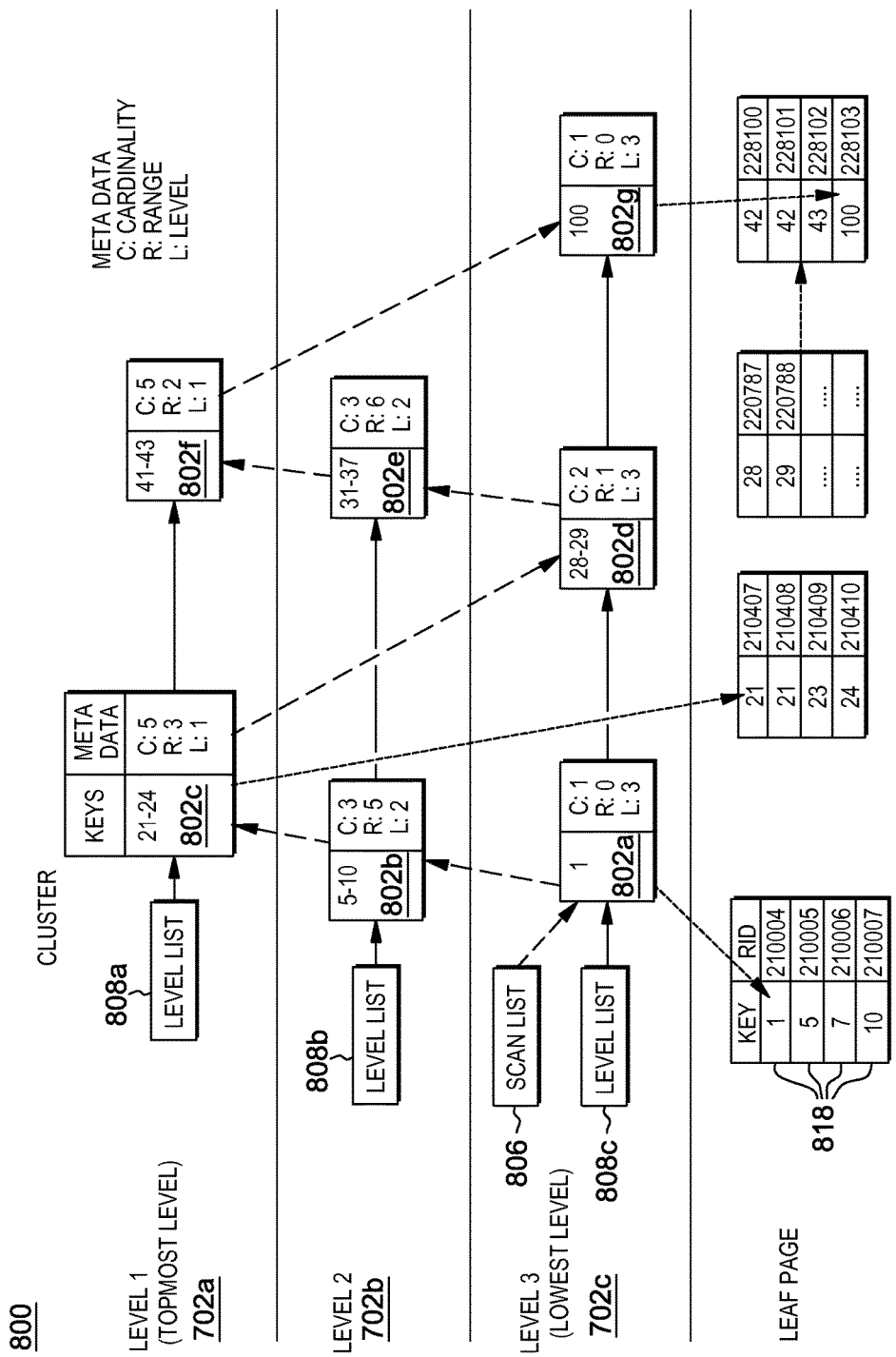
FIG. 8 is a block diagram showing an LOD (level of detail) index data structure according to an embodiment of the present invention.

P01: As shown in FIG. 8, block diagram 800 (referred to hereinafter as LOD index 800) is a multiple-level list structure. In some embodiments of the present invention, LOD index 800 includes the following elements: (i) at least one leaf node 818; (ii) at least one intermediate node 802 (for example, 802a through 802g); (iii) at least one level 702 (for example, level-1 702a through level-3 702c); (iv) a scan list 806; and/or (v) a level list 808 associated with each level 702 (for example, level-1 list 808a through level-3 list 808c). Further with reference to item (i) above, each leaf node 818 is a traditional index leaf node, which is a key to storage address mapping.

P02: Further with reference to item (ii) in paragraph P01 above, intermediate node 802 corresponds to (and characterizes) a cluster of data in the dataset. Intermediate node 802 includes, but is not limited to, one or more of the following attributes: (i) a start key (points to a start key value, which is the smallest value in the corresponding page node); (ii) an end key (points to an end key value, which is the largest value in the corresponding page node); (iii) metadata; (iv) a scan pointer (pointing to the next intermediate node 802 in a scan sequence); and/or (v) a level pointer (pointing to the next sibling intermediate node 802 in the same level). Note, the start key value and the end key value mark the range of data in the cluster to which the start key and end key values belong.

Intermediate nodes 802 are organized into levels, such as level-1 702a, level-2 702b and level-3 702c as shown in LOD index 800. For example, level-1 702a, the topmost level, includes intermediate nodes 802c and 802f. Level-2 702b, includes intermediate nodes 802b and 802e. Level-3 702c, the lowest level, includes intermediate nodes 802a, 802d and 802g.

Further with reference to item (iv) (scan list) in paragraph P01 above, LOD index 800 has at least one scan list 806. A scan list 806 chains all intermediate nodes of LOD index 800 in order of the keys. Scan list 806, as shown in FIG. 8, chains 802a, through 802g. Scan list 806 is represented as a series of dashed-line arrows in LOD index 800.

Further with reference to item (v) (level list) in paragraph P01 above, each level (level-1 702a, level-2 702b, and level-3 702c) in LOD index 800 has at least one level list 808. Level list 808 chains intermediate nodes 802 in its respective level, in order of the keys. Level lists 808 are represented as solid-line arrows in FIG. 8. For example, level-1 702a has level list-1 808a, which chains intermediate nodes 802c and 802f. Level-2 702b, has level-2 list 808b, which chains intermediate nodes 802b and 802e. Level-3 702c has level-3 list 808c, which chains intermediate nodes 802a, 802d and 802g.

Further with reference to item (iii) (metadata) in paragraph P02 above, metadata of node 802 includes, but is not limited to, one or more of: (i) the level to which node 802 is assigned; (ii) the cardinality of node 802; (iii) the range of data in node 802; and/or (iv) density center of data in node 802. Further with reference to item (iii) above, the range of a cluster is defined herein as the difference between the highest value and the lowest value in the data cluster (that is, range=high−low). Alternatively, in some embodiments, range is defined as one more than the difference between the highest and lowest values in a data cluster (that is, range=1+high−low).

Further with reference to item (iv) (scan pointer) in paragraph P02 above, the scan pointer points to the next node in the key sequence. The next node may be in the same or a different LOD level 702. In some embodiments, there are two scan pointers, one pointing to the next node in the key sequence, and one pointing to the previous node in the key sequence.

P03: Some embodiments of the present invention define the following LOD index operations: (i) create LOD index; (ii) LOD index scan; and/or (iii) LOD index data analysis. Further with reference to item (i) above, in some embodiments of the present invention, a user can create an LOD index on one or more specified columns with the following example SQL (structured query language) command:
CREATE LOD INDEX lodidx1 ON table 1(column1) DETAIL LEVELS 3

The SQL command above causes the database server to: (i) create an LOD index, named lodidx1, on a column named column1, in a table named table1; (ii) sort the data of column1; (iii) cluster the sorted data according to density; and/or (iv) group the clustered data into three levels of detail (level-1, level-2 and level-3).

Further with reference to item (ii) (LOD index scan) in paragraph P03 above, a user can make a progressive data transmission with LOD index with the following SQL command:
SELECT column1 FROM table1 UPTO LOD 3

The SQL command above is used only when a low level of detail is desired. An approximate data skeleton is created, based on a small sample of typical data which can accurately represent the whole dataset. In response to this SQL command, the database server, based on LOD index lodidx1 (created at step (i) in paragraph P03 above): (i) progressively transfers the typical data from column1 to the client; (ii) samples all clusters according to a "scan list"; (iii) adopts a sampling ratio specific for each cluster, based in part on the cluster's level; and/or (iv) iterates the scan multiple times until the indicated level of detail (3 in the present example) is completely processed.

Further with reference to item (iii) (LOD index data analysis) in paragraph P03 above a user creates a fast data analysis, with LOD index, by issuing the following SQL command:
SELECT COUNT(column1) FROM table1 UPTO LOD 2

The customer would use the SQL query above to get an approximate count result based on partial levels of clusters. The database server returns a reasonable result, within a very short response time, based on cached metadata in each LOD index intermediate node 802.

LOD index 800 is created using density-based data clustering methods. Density is inversely related to the value distance (the difference between two adjacent values in a sorted list of values). The following symbols are defined: (i) 1-dist($V_i$) is the distance (also known as the difference) between a value $V_i$ and its nearest value in the dataset; and (ii) card($C_i$) is the cardinality of values in cluster $C_i$.

P04: LOD index 800 is created according to the following flow based on the assumption that in a natural dataset, 1-dist($V_i$) conforms to a "normal" distribution (also known as a "Gaussian" distribution). LOD index 800 is created as follows: (i) slice the normal distribution variable range into a number of levels; (ii) sort 1-dist($V_i$) in descending order; (iii) slide the sorted 1-dist($V_i$) into levels according to the proportion each level takes in the normal distribution; and/or (iv) generate one or more clusters within each level.

Further, with reference to item (iii) in paragraph P04 above, as shown in histogram 902 of FIG. 9, the normal distribution of 1-dist($V_i$) is sliced into three sections (levels) as follows: (i) level-1 702a has 1-dist($V_i$) up to 1 standard deviation from the mean; (ii) level-2 702b has 1-dist($V_i$) greater than 1 and up to 2 standard deviations from the mean; and (iii) level-3 702c has 1-dist($V_i$) greater than 2 standard deviations from the mean.

Figure 9:
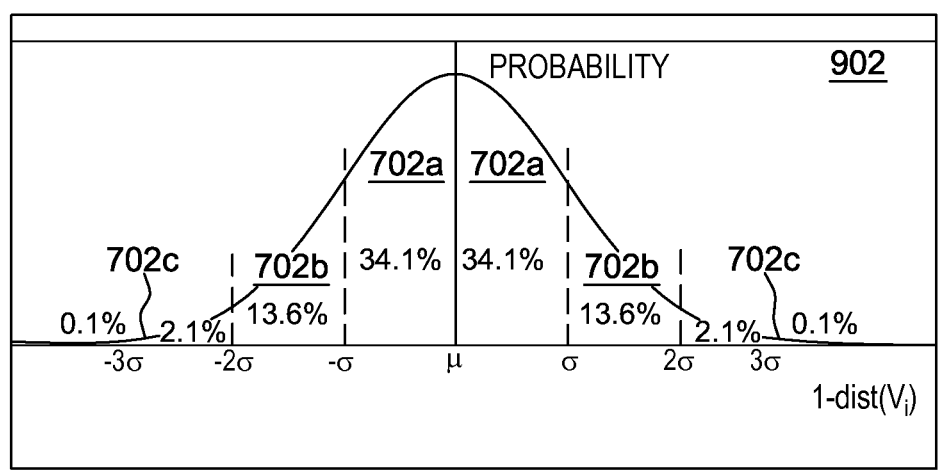
FIG. 9 set of graphs that are helpful in understanding embodiments of the present invention.
Figure 9:
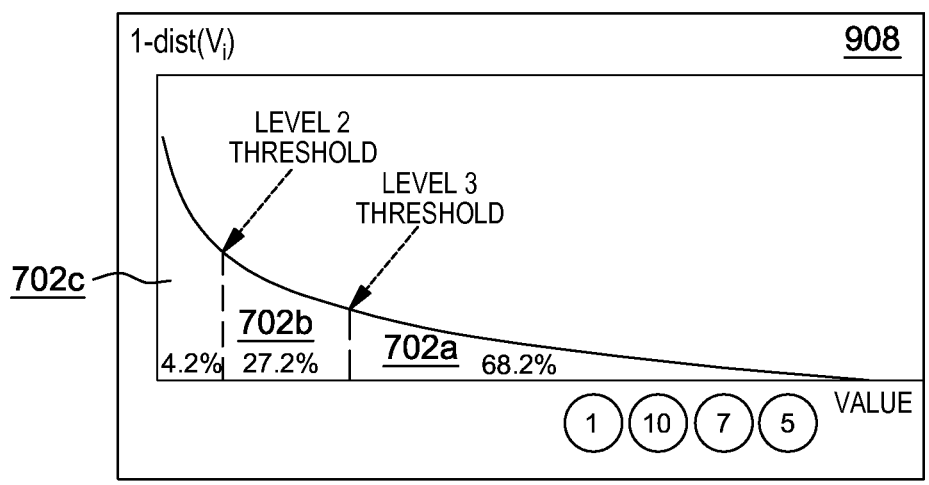

As shown in the set of graphs 900 of FIG. 9, the three levels represented in histogram 902 (702a, 702b, and 702c) are also shown in graph 908. In accordance with a normal (Gaussian) distribution, area 702a encompasses approximately 68.2 percent of the 1-dist($V_i$) values, area 702b encompasses approximately 27.2 percent of the 1-dist($V_i$) values, and area 702c encompasses approximately 4.2 percent of the 1-dist($V_i$) values.

According to some embodiments of the present invention LOD index 800 is not restricted to three levels. LOD index 800 can be sliced into any number of levels. The boundaries between levels are not restricted to integer numbers of standard deviations from the mean of the normal 1-dist($V_i$) distribution. Further, the levels, and the boundaries between levels, can be defined in terms of factors other than standard deviation.

Figure 10:
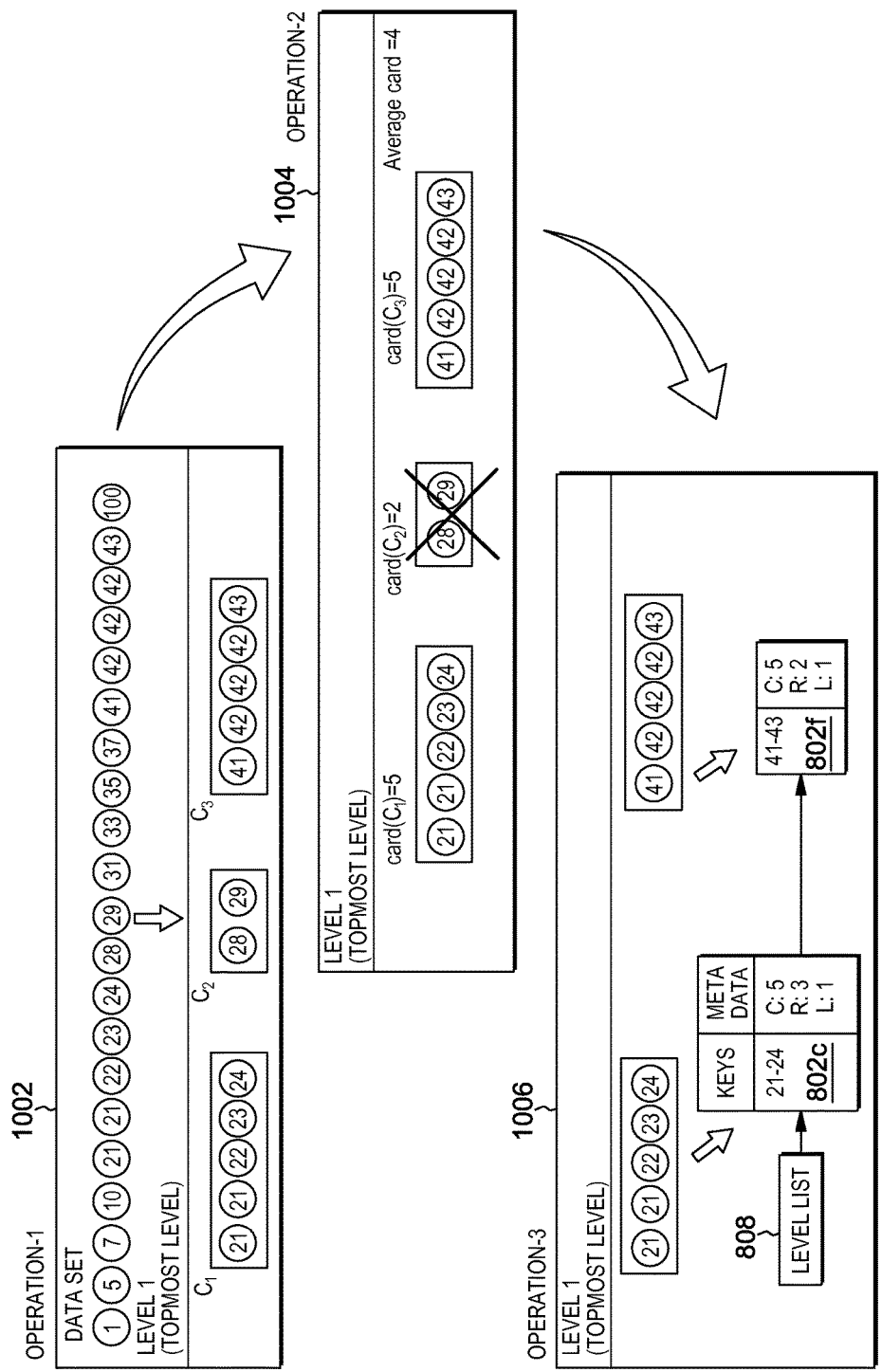
FIG. 10 is a flowchart of a second embodiment of a method according to the present invention, specifically a method for constructing an LOD index according to an embodiment of the present disclosure.

P05: Further with reference to item (iv) in paragraph P04 above, clusters are generated as shown in block diagrams 1002, 1004 and 1006 of FIG. 10 as follows: (i) within each level, merge each value into the nearest cluster, or merge two values to create a new cluster, in ascending order of 1-dist ($V_i$), as shown in operation-1 1002; (ii) calculate the cardinality of each cluster in each level; (iii) within each level, calculate the average cardinality of all clusters in the level; (iv) move any clusters, whose cardinality is less than the average cardinality for all clusters in the level, to the next lower level as shown in operation-2 1004 (to prevent formation of some extremely small clusters (outliers)); (v) calculate metadata of each cluster; (vi) generate intermediate nodes 802*c* and 802*f* of LOD index 800 as shown in operation-3 1006; (vii) make the range keys (the start key and/or the end key) part of each node, each key pointing to an index leaf node (as in a traditional index); (viii) generate a level list 808 (chaining node 802*c* and 802*f* in this example) within each level; and/or (ix) insert each node 802 into scan list 806 of LOD index 800, wherein each node is positioned such that scan list 806 traverses the nodes in ascending key order (refer to scan list 806 of FIG. 8).

The LOD Index Scan (progressive transmission using LOD index) will now be discussed in the following paragraphs according to some embodiments of the present invention.

In a progressive data transmission with LOD index (also referred to herein as an LOD index scan) a data scan is conducted. During the data scan, the dataset is sampled in such a way as to accurately represent the data distribution. The sampled data is then transmitted. This approach minimizes database response time, especially for queries on a very large dataset. A "bottom-up" method is used to scan the LOD index for this purpose. Priority is given to values in lower levels of LOD index 800. Subsequent scans are conducted, sampling more of the data with each scan. When the selected level of details are all transmitted, the scanning stops.

Figure 11:
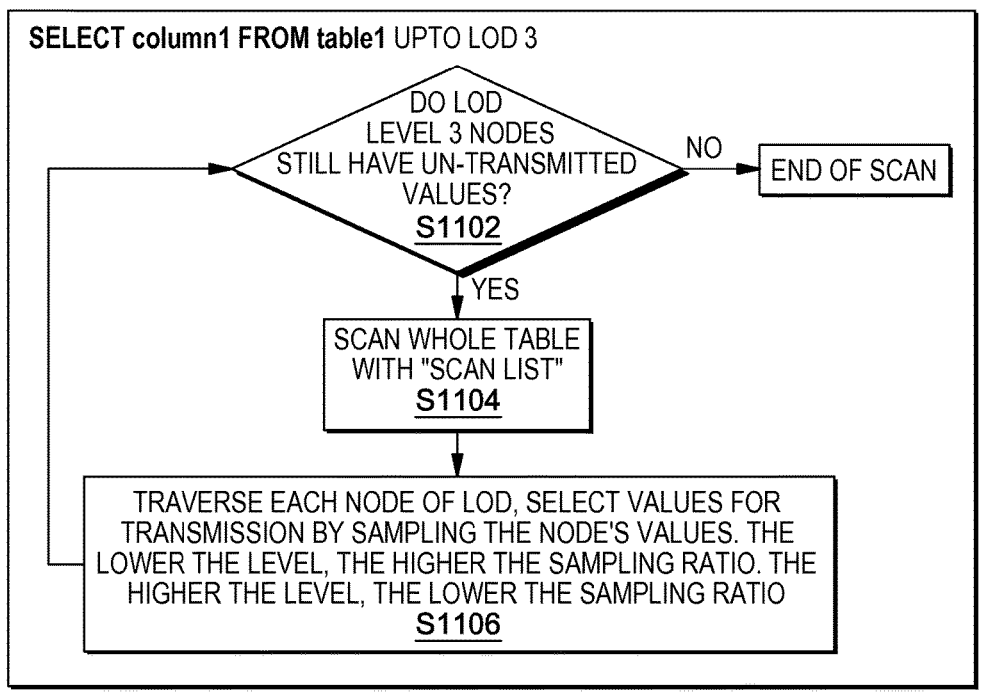
FIG. 11 is a flowchart of a third embodiment of a method according to the present invention.

As shown in FIG. 11, flowchart 1100 corresponds to "LOD index scan" (progressive transmission using LOD index) in some embodiments of the present invention, in response to the following SQL query:
SELECT column1 FROM Table1 UPTO LOD 3

Flowchart 1100 includes the following operations (with process flow among and between the operations as shown by arrows in FIG. 11): S1102, S1104, and S1106.

Figure 12:
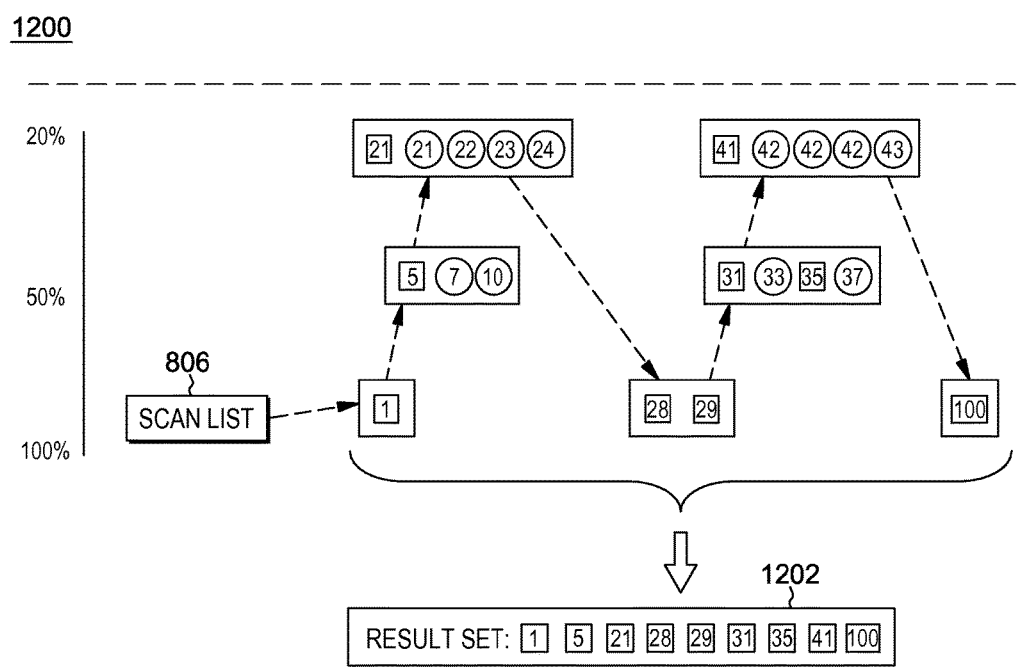
FIG. 12 is another block diagram showing data flow according to an embodiment of the present invention.

Block diagram 1200 of FIG. 12 shows a scan sequence corresponding to the operations shown in flowchart 1100. The scan sequence is conducted in accordance with scan list 806. Further, block diagram 1200 shows example result set 1202 based on a scan sequence corresponding to operations shown in flowchart 1100.

Figure 13:
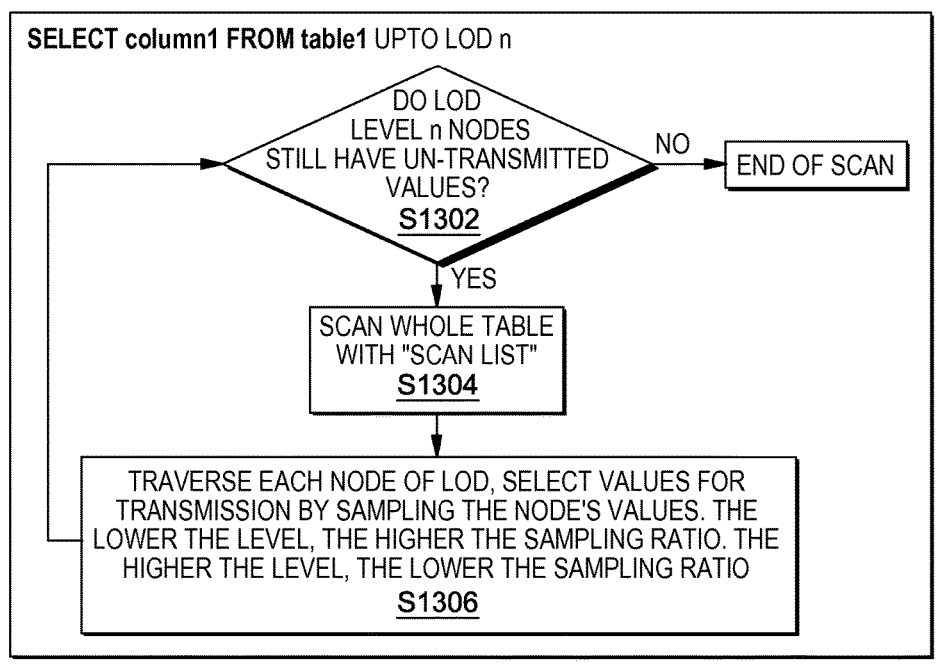
FIG. 13 is a flowchart of a fourth embodiment of a method according to the present invention.

As shown in FIG. 13, flowchart 1300 corresponds to "LOD Index Scan" (progressive transmission using LOD index) in some embodiments of the present invention, in response to the following SQL query:
SELECT column1 FROM Table1 UPTO LOD n Flowchart 1300 includes the following operations (with process flow among and between the operations as shown by arrows in FIG. 13): S1302, S1304, and S1306.

Figure 14:
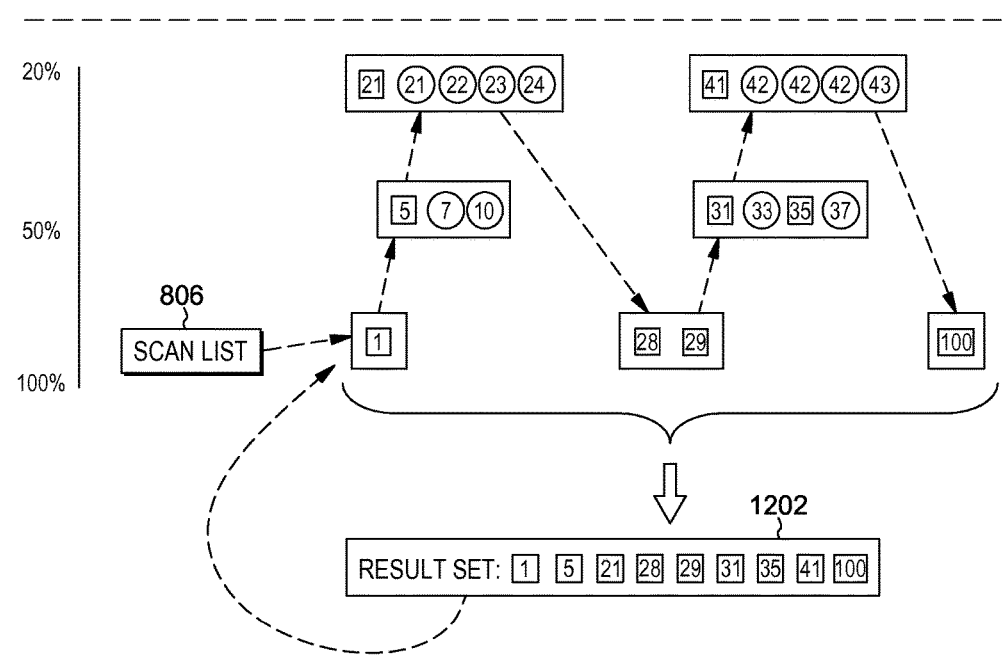
FIG. 14 is another block diagram showing data flow according to an embodiment of the present invention.

Block diagram 1400 of FIG. 14 shows a scan sequence corresponding to the operations shown in flowchart 1300. The scan sequence is conducted in accordance with scan list 806. Further, block diagram 1400 shows example result set 1202 based on a scan sequence corresponding to operations shown in flowchart 1300. The LOD scan based on scan list 806, proceeds in a loop-like manner. The LOD scan may iterate multiple times in accordance with scan list 806. In each iteration, it samples each cluster along the scan list, then loops back to the header cluster. The curved arrow, is not a real data structure which represents a link. The curved arrow is a figure to demonstrate the scan flow looping back to the header. This means the last iteration finishes.

LOD index fast data analysis will now be discussed in the following paragraphs according to some embodiments of the present invention. LOD index 800 accelerates the analyzing query. When generating results for an analyzing query, higher level data in LOD index 800 is used for the following reasons: (i) higher level data represents the major part of a dataset; and/or (ii) higher level data is highly concentrating, which means the data can be well represented by metadata stored in the higher level intermediate nodes 802 of LOD index 800.

Figure 15:
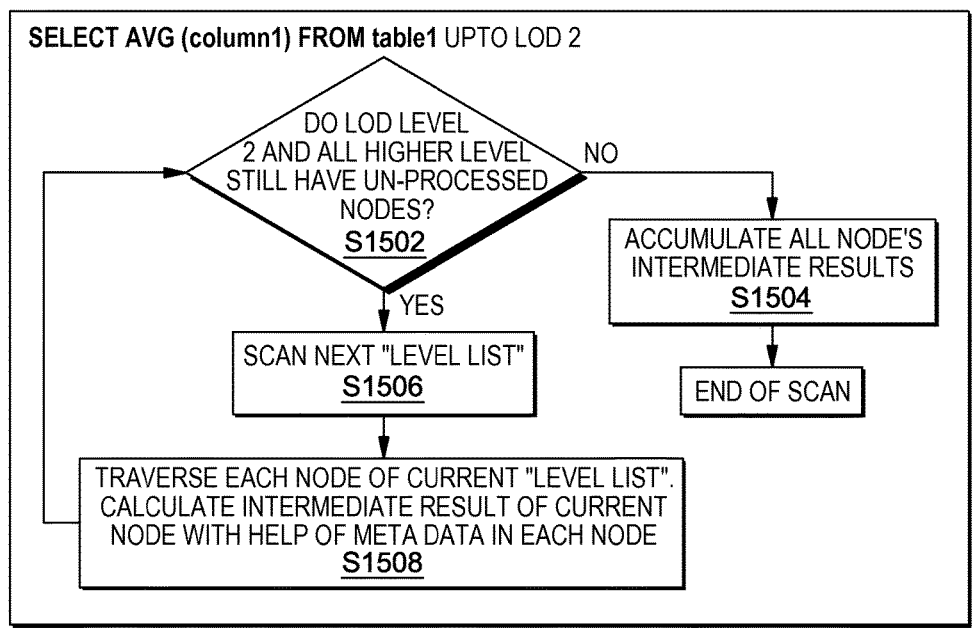
FIG. 15 is a flowchart of a fifth embodiment of a method according to the present invention.

In some embodiments of the present invention, a "top down" scan of LOD index 800 is used for LOD index fast data analysis. Priority is given to values/metadata stored in higher levels of LOD index 800. When the selected level of details are all processed, the scan stops. As shown in FIG. 15, flowchart 1500 corresponds to "LOD index scan" (analysis query) in response to the following SQL query:
SELECT AVG(column1) FROM table1 UPTO LOD 2

Flowchart 1500 corresponds to "LOD index scan" (analysis query—fast data analysis) including the following operations (with process flow among and between the operations as shown by arrows in FIG. 15); S1502, S1504, S1506 and S1508.

Figure 16:
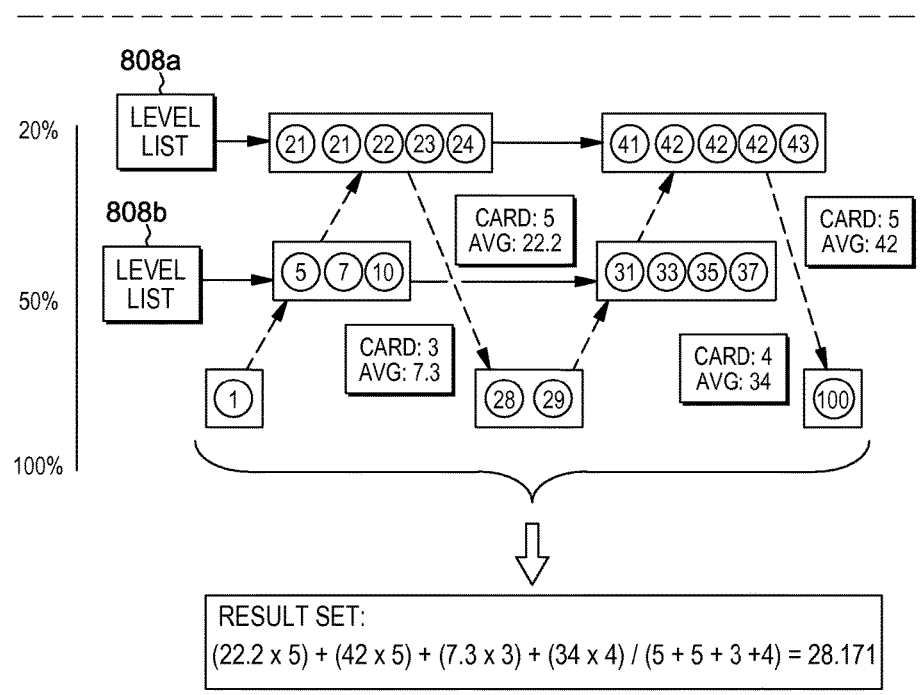
FIG. 16 is another block diagram showing data flow according to an embodiment of the present invention.

Block diagram 1600 of FIG. 16 shows example sampling and calculation results obtained from the scan sequence corresponding to the operations shown in flowchart 1500. In some embodiments of the present invention, and referring to the example data shown in FIG. 16, an average, weighted by cardinality, is calculated as follows: $(22.2\times5)+(42\times5)+(7.3\times3)+(34\times4)/(5+5+3+4)=28.171$. In some embodiments, an unweighted average is calculated as follows: $(22.2+42+7.3+34)/4=26.375$.

Figure 17:
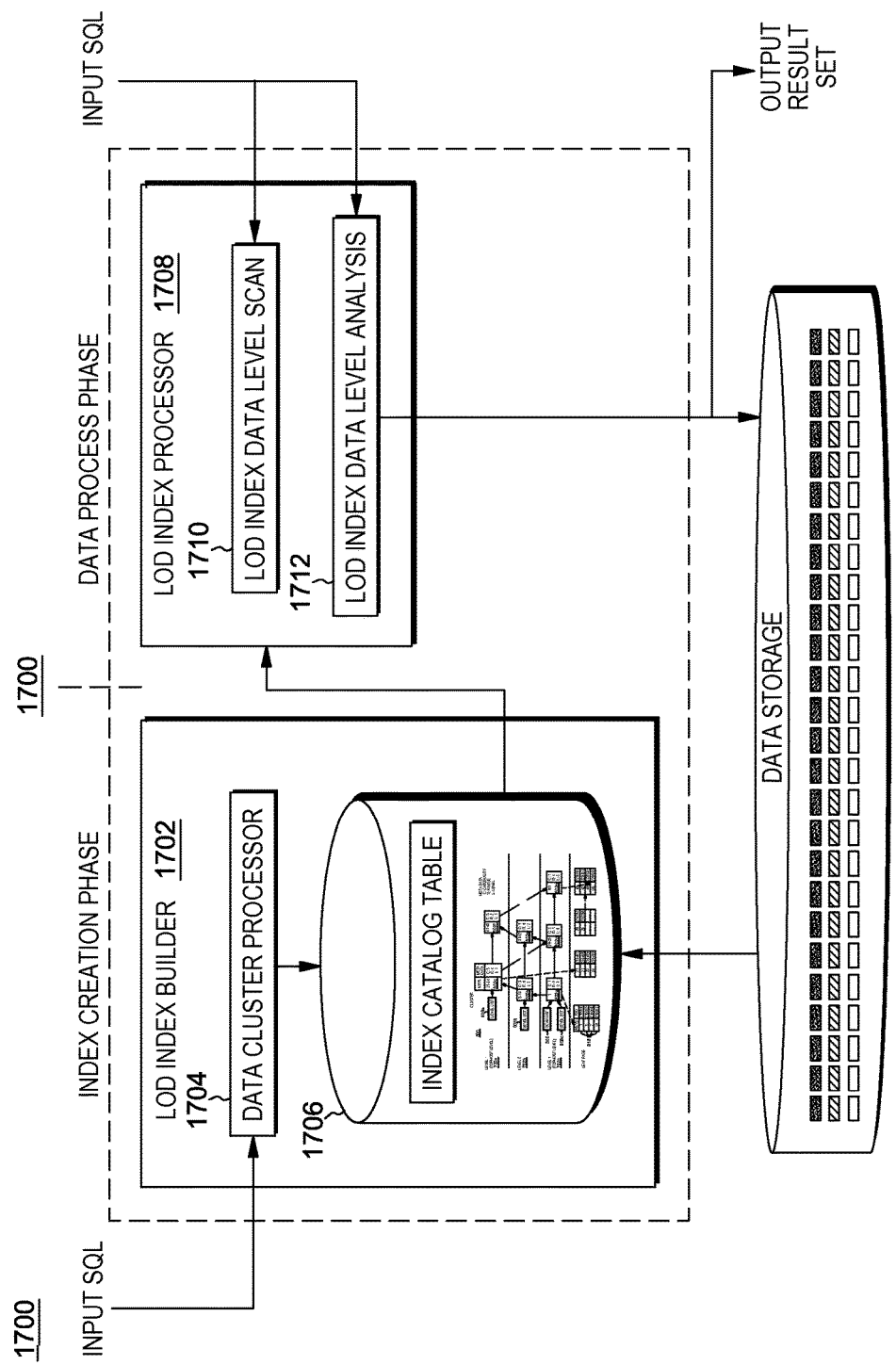
FIG. 17 is a block diagram that is helpful in understanding embodiments of the present invention.

Block diagram 1700 of FIG. 17 shows a database system in some embodiments of the present invention. The database system includes components which can be implemented by extending the database system's existing function modules. LOD index builder 1702 creates and stores LOD index 800 in the database system. LOD index builder 1702 includes: (i) data cluster processor 1704 which parses input LOD index CREATE/SCAN statements; and/or (ii) index catalog table 1706 which is a new database catalog table for storing LOD index 800 metadata.

LOD index processor 1708 executes LOD SCAN requests. LOD index processor 1708 includes: (i) LOD index data level scan 1710 which processes level scan requests; and/or (ii) LOD index data Level analysis 1712 which processes data level analysis requests.

Efficiency will now be discussed in the following paragraphs according to some embodiments of the present invention.

P06: Some embodiments of the present invention may include one, or more, of the following features, characteristics and/or advantages: (i) the storage footprint of LOD index 800 is far smaller than the storage footprint of a traditional B+ tree index; and/or (ii) index maintenance overhead is acceptable.

Further with respect to item (i) in paragraph P06 above: (i) in each internal node 802, LOD index 800 stores the "start key" and the "end key" (not necessarily all key values); (ii) the size of each node 802 is predictable, and invariable; and/or (iii) leaf node 818 is identical with a traditional clustering index leaf node.

Further with respect to item (ii) paragraph P06 above: (i) the cost of an operation to select, update or delete a data point depends mainly on the addressing of the index entry corresponding to the data point which needs to be updated; (ii) when adding or deleting data, the change to the index structure is located in a single internal node; (iii) metadata calculation is incremental; and/or (iv) updates can be performed in "real time" or in a "delay reorganization" manner.

Further with respect to item (i) in the above paragraph, in a conventional cluster index, B+ tree: O(log N+K) where N is the cardinality of the index column and K is the updated entry offset within a node. In contrast to the B+ tree type index, in an LOD index: O(n+K) where n is the number of clusters and K is the updated entry offset within a node. (Note: One skilled in the relevant art will recognize "big O" notation as it relates to an algorithm's processing time or space requirements in terms of input size.)

Figure 18:
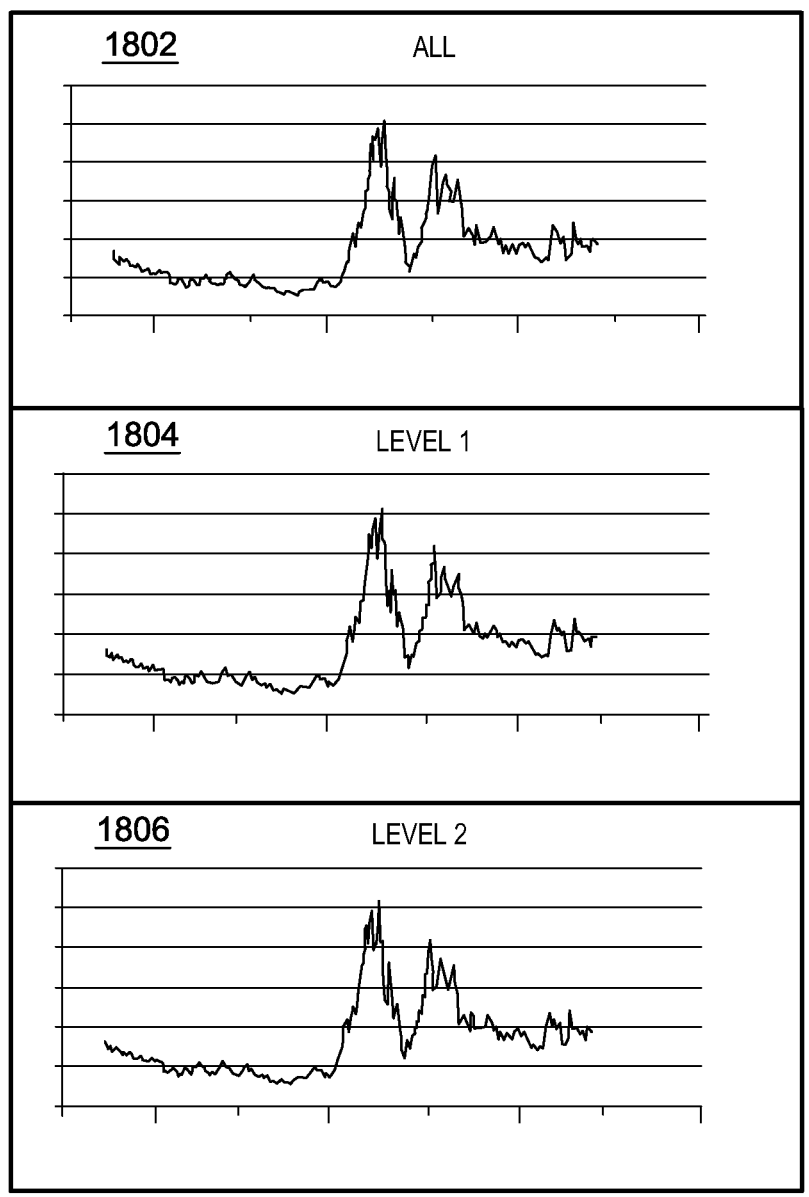
FIG. 18 is a set of graphs that are helpful in understanding embodiments of the present invention.

In some embodiments of the present invention, graphs 1802, 1804, and 1806 of FIG. 18 show the results of LOD index sampling. Graph 1802 represents a full data set. Graph 1804 represents an LOD index sampling of level 1 only (the topmost level) of the data set. Graph 1806 represents an LOD index sampling of levels 1 and 2 of the data set.

Some embodiments of the present invention provide a database index and LOD (level of details) index, which is a multilayer list structure composed of "leaf nodes" and "intermediate nodes". A leaf node is composed of pairs of index keys and RIDs (row ids). All leaf nodes are chained together in order of index key by a single list (not shown).

In some embodiments of the present invention an intermediate node 802, which represents a density cluster of a dataset, is composed of a start index key, a stop index key and "metadata". The start and stop index keys point to corresponding entries in leaf nodes and define a range of rows. (A "row" is also known, in traditional database terminology, as a "record"). "Metadata" includes at least "density, cardinality, average, and sum" of a corresponding cluster. All intermediate nodes are chained together in order of index key by scan list 806. Further with respect to the start and stop index keys above, a start key corresponds to the smallest value in a cluster. A stop key corresponds to the largest value in the cluster.

In some embodiments of the present invention intermediate nodes are grouped into N levels of detail. N is indicated in LOD index definition. Cluster properties "density" and "cardinality" determine to which level a node is assigned. Intermediate nodes belonging to one level of detail are all chained together in order of index key by a list named level-i list. For example, intermediate nodes 802c and 802f, belonging to level-1 702a, are chained together, in order of index key, by level-1 list 808a of FIG. 8.

Some embodiments of the present invention also provide a method of constructing the LOD index and a method for using the LOD index. The basic idea is to divide a large dataset into multiple subsets of various detail levels. Using LOD index, a DBMS (database management system) can return a subset of data, belonging to one or more detail levels, with a very quick response time. The remaining detail levels may be transmitted progressively if necessary.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The invention claimed is:

1. A method comprising:
   receiving a database;
   generating a level of details index (LODI) for the database, with the LODI being a multilayer list structure including a plurality of leaf nodes and a plurality of intermediate nodes, and with the generation of the LODI including:
   creating the each given leaf node of the plurality of leaf nodes by assigning the given leaf node: (i) an index key value, and (ii) a row identification value identifying a corresponding row of the database,
   chaining together the leaf nodes of the plurality of leaf nodes by a leaf list, with the single leaf having an order determined by the index key values of the plurality of leaf nodes,
   creating each given intermediate node of the plurality of intermediate nodes, with each given intermediate node representing a density cluster of a dataset, and with each given intermediate node being assigned: (i) a pair of start/stop index key values that point to corresponding entries in leaf nodes of the given intermediate node and define a cluster of rows corresponding to the given intermediate node, (ii) a density value for the cluster of rows corresponding to the given intermediate node, (iii) cardinality value for the cluster of rows corresponding to the given intermediate node, (iv) an average value cluster for rows corresponding to the given intermediate node, and (v) a sum value for cluster for rows corresponding to the given intermediate node,
   for each given intermediate node of the plurality of intermediate node, determining a level of detail value, with the level of detail value being an integer between 1 and N, and with the a level of detail value grouping the intermediate nodes of the plurality of intermediate nodes into N levels of detail, where N is a predetermined positive integer, and with determination of the level of value for the given intermediate node being based, at least in part, upon the density value of the given intermediate node and the cardinality value of the given intermediate node,
   chaining together the intermediate nodes of the plurality of intermediate nodes in a global intermediate list, with the global intermediate list having an order determined by the pairs of start/stop index key values of the plurality of intermediate nodes; and transmitting a selected level of detail data set, where the selected level of detail data set includes a plurality of nodes from the chained together leaf nodes and the chained together intermediate nodes of the multilayer list structure, with the transmitted selected level of detail data set including:

sampling, from each layer from the lowest layer of the multilayer list structure of the LODI to a selected layer of the multilayer list structure of the LODI, a subset of nodes of the LODI based, at least in part, on a selected layer of the multilayer list structure of the LODI;

wherein transmitting a selected level of detail data set minimizes database response time, especially for queries on very large datasets.

2. The method of claim 1 further comprising:

for given each level of detail value 1 to N, chaining together intermediate nodes having the given level of detail value by a detail-level list, with each detail-level list having an order determined by the pairs of start/stop index key values of the intermediate nodes in the detail-level list.

3. A computer program product comprising:

a non-transitory machine readable storage device; and computer code stored on the non-transitory machine readable storage device, with the computer code including instructions for causing a processor(s) set to perform operations including the following:

receiving a database;

generating a level of details index (LODI) for the database, with the LODI being a multilayer list structure including a plurality of leaf nodes and a plurality of intermediate nodes, and with the generation of the LODI including:

creating the each given leaf node of the plurality of leaf nodes by assigning the given leaf node: (i) an index key value, and (ii) a row identification value identifying a corresponding row of the database, chaining together the leaf nodes of the plurality of leaf nodes by a leaf list, with the single leaf having an order determined by the index key values of the plurality of leaf nodes, creating each given intermediate node of the plurality of intermediate nodes, with each given intermediate node representing a density cluster of a dataset, and with each given intermediate node being assigned: (i) a pair of start/stop index key values that point to corresponding entries in leaf nodes of the given intermediate node and define a cluster of rows corresponding to the given intermediate node, (ii) a density value for the cluster of rows corresponding to the given intermediate node, (iii) cardinality value for the cluster of rows corresponding to the given intermediate node, (iv) an average value cluster for rows corresponding to the given intermediate node, and (v) a sum value for cluster for rows corresponding to the given intermediate node, for each given intermediate node of the plurality of intermediate node, determining a level of detail value, with the level of detail value being an integer between 1 and N, and with the a level of detail value grouping the intermediate nodes of the plurality of intermediate nodes into N levels of detail, where N is a predetermined positive integer, and with determination of the level of value for the given intermediate node being based, at least in part, upon the density value of the given intermediate node and the cardinality value of the given intermediate node, and chaining together the intermediate nodes of the plurality of intermediate nodes in a global intermediate list, with the global intermediate list having an order determined by the pairs of start/stop index key values of the plurality of intermediate nodes;

transmitting a selected level of detail data set, where the selected level of detail data set includes a plurality of nodes from the chained together leaf nodes and the chained together intermediate nodes of the multilayer list structure, with the transmitted selected level of detail data set including:

sampling, from each layer from the lowest layer of the multilayer list structure of the LODI to a selected layer of the multilayer list structure of the LODI, a subset of nodes of the LODI based, at least in part, on a selected layer of the multilayer list structure of the LODI;

wherein transmitting a selected level of detail data set minimizes database response time, especially for queries on very large datasets.

4. The product of claim 3 wherein the computer code further includes instructions for causing the processor(s) set to perform the following operations:

for given each level of detail value 1 to N, chaining together intermediate nodes having the given level of detail value by a detail-level list, with each detail-level list having an order determined by the pairs of start/stop index key values of the intermediate nodes in the detail-level list.

5. A computer system comprising:

a processor(s) set;

a machine readable storage device; and computer code stored on the machine readable storage device, with the computer code including instructions for causing the processor(s) set to perform operations including the following:

receiving a database;

generating a level of details index (LODI) for the database, with the LODI being a multilayer list structure including a plurality of leaf nodes and a plurality of intermediate nodes, and with the generation of the LODI including:

creating the each given leaf node of the plurality of leaf nodes by assigning the given leaf node: (i) an index key value, and (ii) a row identification value identifying a corresponding row of the database, chaining together the leaf nodes of the plurality of leaf nodes by a leaf list, with the single leaf having an order determined by the index key values of the plurality of leaf nodes, creating each given intermediate node of the plurality of intermediate nodes, with each given intermediate node representing a density cluster of a dataset, and with each given intermediate node being assigned: (i) a pair of start/stop index key values that point to corresponding entries in leaf nodes of the given intermediate node and define a cluster of rows corresponding to the given intermediate node, (ii) a density value for the cluster of rows corresponding to the given intermediate node, (iii) cardinality value for the cluster of rows corresponding to the given intermediate node, (iv) an average value cluster for rows corresponding to the given intermediate node, and (v) a sum value for cluster for rows corresponding to the given intermediate node, for each given intermediate node of the plurality of intermediate node, determining a level of detail value, with the level of detail value being an integer between 1 and N, and with the a level of detail value grouping the intermediate nodes of the plurality of intermediate nodes into N levels of detail, where N is a predetermined positive integer, and with determination of the level of value for the given intermediate node being based, at least in part, upon the density value of the given intermediate node and the cardinality value of the given intermediate node, and chaining together the intermediate nodes of the plurality of intermediate nodes in a global intermediate list, with the global intermediate list having an order determined by the pairs of start/stop index key values of the plurality of intermediate nodes;

transmitting a selected level of detail data set, where the selected level of detail data set includes a plurality of nodes from the chained together leaf nodes and the chained together intermediate nodes of the multilayer list structure, with the transmitted selected level of detail data set including:

sampling, from each layer from the lowest layer of the multilayer list structure of the LODI to a selected layer of the multilayer list structure of the LODI, a subset of nodes of the LODI based, at least in part, on a selected layer of the multilayer list structure of the LODI;

wherein transmitting a selected level of detail data set minimizes database response time, especially for queries on very large datasets.

6. The system of claim 5 wherein the computer code further includes instructions for causing the processor(s) set to perform the following operations:

for given each level of detail value 1 to N, chaining together intermediate nodes having the given level of detail value by a detail-level list, with each detail-level list having an order determined by the pairs of start/stop index key values of the intermediate nodes in the detail-level list.

* * * * *